3,147,317
METHOD OF PREPARING ELASTOMERIC BLEND OF BENZENE-SOLUBLE CHLOROPRENE POLYMER AND A CROSS-LINKED CHLOROPRENE POLYMER
Hans Jungk and Rudolph Pariser, Wilmington, Del., assignors to E. I. du Pont de Nemours and Company, Wilmington, Del., a corporation of Delaware
No Drawing. Filed Apr. 17, 1962, Ser. No. 188,234
6 Claims. (Cl. 260—890)

This invention relates to novel elastomers and, more particularly, to easily processable elastomers comprising blends of chloroprene polymers.

It has long been known that chloroprene polymer elastomers may be increased in plasticity by being prepared in the presence of so-called modifying agents or by being treated, after their formation, with plasticizing agents. The control of plasticity, however, is not the whole answer to the problem of producing an elastomer which has good working properties. Elastomers in general do not completely retain the exact size and shape into which they are formed by rubber-working machinery. This characteristic, known as "nerve" or "elastic memory," is present in chloroprene polymers and somewhat interferes with their use in certain delicate operations such as the high-speed extrusion of complicated shapes.

It is an object of the present invention to provide an elastomer which may be easily processed. A further object is to provide an elastomer comprising a blend of chloroprene polymers, which elastomer has greatly improved working properties as represented by a relatively low "die swell." A further object is to provide a process for the preparation of an improved elastomer comprising a blend of chloroprene polymers. Other objects will appear hereinafter.

These and other objects are accomplished in accordance with this invention by an elastomeric composition comprising an intimate blend of (a) a solid, benzene-soluble chloroprene polymer, and (b) a cross-linked polymer selected from the group consisting of polychloroprene and a copolymer of chloroprene and no more than about 10% by weight, based on the total weight of the monomer, of another ethylenically unsaturated monomer copolymerizable therewith selected from the group consisting of monoolefinic compounds and conjugated diolefinic compounds, the cross-linked polymer being prepared by polymerization of the monomer in an aqueous emulsion in a system wherein the ratio, $$R = \frac{\text{weight of polymer}}{\text{weight of polymer plus monomer}}$$

throughout the polymerization has an average value, $\bar{R}$, of at least 0.8; the ratio of (a) to (b) on a weight basis being between about 1:4 and about 4:1.

The average value, $\bar{R}$, is represented by the following expression:

$$\bar{R} = \frac{\int_0^{P_f} \left(\frac{P}{P+M}\right) dP}{P_f}$$

wherein $P_f$ is the total weight of polymer being averaged, and P and M are the weights of polymer and monomer, respectively, present at any stage in the polymerization.

In a polymerization system in which no unreacted monomer has been removed, the value R, when multiplied by 100, becomes the percent of monomer conversion at any stage of polymerization, and the value $\bar{R}$ becomes the average percent of monomer conversion during the entire polymerization.

*Component (a).*—The chloroprene polymers of component (a) are any of the conventional solid, benzene-soluble chloroprene polymers of the prior art. The term "chloroprene" used in this application is the accepted name for the compound 2-chloro-1,3-butadiene. The chloroprene polymers may be prepared by polymerizing chloroprene, or a mixture of monomers consisting of chloroprene and up to about 50 percent, by weight, based on total weight of the monomer, of one or more ethylenically unsaturated monomers copolymerizable therewith, by well-known methods. See for example, the following U.S. patents: 1,950,436; 2,227,517; 2,321,693; 2,371,719; 2,463,225; 2,481,044; 2,494,087; 2,567,117; 2,576,009; 2,831,842; and 2,914,497. Unreacted monomer may be removed as described in U.S. 2,467,769. The preferred polymers are prepared by partial polymerization of the monomer composition in the presence of an aliphatic mercaptan having 4 to 18 carbon atoms, such as butyl mercaptan, octyl mercaptan, dodecyl mercaptan, or "technical dodecyl mercaptan," which is a mixture of primary aliphatic mercaptans consisting predominantly of 1-dodecanthiol; a typical composition is: 1-decanthiol, 3%; 1-dodecanthiol, 61%; 1-tetradecanethiol, 23%; 1-hexadecanethiol, 11%; 1-octadecanethiol, 2%. Other conventional chain transfer agents may be used.

Examples of ethylenically unsaturated monomers copolymerizable with chloroprene are:

Vinyl aromatic compounds, such as styrene, the vinyl toluenes, and vinylnaphthalenes;

Aliphatic conjugated diolefinic compounds, such as 1,3 butadiene, isoprene, 2,3-dimethyl-1,3-butadiene, and 2,3-dichloro-1,3-butadiene.

Vinyl ethers, esters, and ketones; such as methyl vinyl ether, vinyl acetate, and methyl vinyl ketone;

Esters, amides and nitriles of acrylic and methacrylic acid, such as ethyl acrylate, methyl methacrylate, methacrylamide, and acrylonitrile.

By "solid" it is meant that the polymers of component (a) have a Mooney viscosity, ML 1+2.5 (100° C.) of at least 25, determined by ASTM Method D-1646-59T. By "benzene-soluble" it is meant that the polymer will dissolve in benzene at room temperature. Benzene solubility may be demonstrated by known techniques. For example, a 2- to 3-gram sample will dissolve in about 250 ml. of benzene at room temperature within about 5 to 10 hours with mild agitation.

*Component (b).*—The cross-linked, benzene-insoluble chloroprene polymers of component (b) of the blend may be homopolymers of chloroprene or copolymers prepared by polymerizing a mixture of monomers containing at least 90 percent by weight of chloroprene, the remainder being an ethylenically unsaturated copolymerizable monomer, which may be a monoolefinic compound or a conjugated diolefinic compound. Examples of suitable copolymerizable monomers include those mentioned previously as being suitable comonomers in preparing the polymers of component (a).

Any of the conventional emulsifying agents may be used in making the monomer emulsion. These include the water-soluble salts, particularly the sodium, potassium or ammonium salts, of compounds of the following types: long-chain fatty acids; rosins and rosin derivatives such as wood rosin, tall oil rosin, disproportionated rosin, or partially polymerized rosin; higher alcohol sulfates; aryl sulfonic acids, such as nonylbenzene sulfonic acid; and formaldehyde condensates of aryl sulfonic acids, such as the condensation product of formaldehyde and naphthalene-sulfonic acid.

The conventional free-radical type polymerization initiators are used, which are compounds capable of yielding free radicals in the polymerization system. These include, for example, compounds containing the peroxy radical. Examples of these are hydrogen peroxide, cumene hydroperoxide, and water-soluble salts of persulfuric acid such as sodium persulfate, potassium persulfate, and ammonium persulfate. Other types of free-radical polymerization initiators which may be used are the azo compounds disclosed in U.S 2,471,959, such as 2,2′-azobis-(2-methylpropionitrile). Still others are the nitrogen fluorides or the sodium, potassium, or ammonium ferricyanides. In carrying out the polymerization, an aqueous solution of the polymerization initiator is usually added to the polymerization system at such a rate that the desired rate of polymerization is maintained. Rate of polymerization is usually determined by measuring the specific gravity of the emulsion during the polymerization.

The polymerization may be carried out between 0° C. and 60° C., preferably between 40 and 58° C.

It is preferred to carry out the polymerization in the absence of any of the conventional modifying agents, such as aliphatic mercaptans.

The pH of the polymerization system may be slightly acidic, neutral, or in the alkaline range. It is preferrred to conduct the polymerization at a pH ranging from 7 to 13.5.

Polymerization may be stopped by the addition of conventional "short-stopping" agents, such as a mixture of phenothiazine and 4-tert-butylcatechol, as described in U.S. 2,576,009. Excess monomer, if present, may be removed by steam stripping as disclosed in U.S. 2,467,769.

As usual in chloroprene polymerizations, oxygen is excluded from the atmosphere in the polymerization vessel. This is conveniently done by sweeping the reaction vessel with a stream of an inert gas such as nitrogen and maintaining the atmosphere of the gas above the polymerization medium.

The polymer content of the final latex is not critical but usually ranges from about 35 to about 55 percent of the weight of the polymerization system.

The essential feature in the preparation of the chloroprene polymers of component $(b)$ is that the monomer is polymerized in a system in which the average ratio, $\bar{R}$, defined in the expression given above, is equal to or greater than 0.8. There are numerous ways in which this may be accomplished. In one method, polymerization is begun, preferably using a relatively small volume of monomer emulsion, and polymerization is continued without introduction of additional monomer until the monomer conversion in the system is 0.8 or greater. Feed of monomer emulsion is then begun and is continued, either continuously or intermittently, at such a rate as to insure that the average, $\bar{R}$, has the desired value. It is not essential that the ratio, $R$, at any given moment be above 0.8. There may be periods during the polymerization in which the ratio, $R$, falls below 0.8. The significant feature is that the average ratio, $\bar{R}$, during the entire polymerization, is equal to or greater than 0.8. It is preferred to carry out the polymerization so that the value of the average, $\bar{R}$, is at least 0.88.

The reaction vessel may be a single vessel to which monomer emulsion is added until the vessel is full. If desired, monomer emulsion may be added and product emulsion may be withdrawn simultaneously. In a preferred method, an over-flow system is used in which monomer emulsion is added at the same rate that product emulsion is withdrawn. In this case, the average, $\bar{R}$, remains essentially constant throughout the polymerization. In another method polymerization may be begun and unreacted monomer may be removed before the monomer conversion has reached 80 percent. The ratio of weight of polymer to total weight of polymer plus monomer in this way can be increased to a value of 0.8 or greater. Feed of monomer emulsion is then begun and is continued as previously described. Other methods will be within the scope of those skilled in the art.

The preparation of chloroprene polymers by the method described above results in cross-linked chloroprene polymers which, when blended with conventional benzene-soluble chloroprene polymers in certain proportions, yield elastomeric compositions having exceptionally good working properties. If, however, the polymers are prepared by a process in which the average, $\bar{R}$, is less than 0.8, the blends prepared from the resulting polymer will not show significant improvement in processability over the unblended benzene-soluble component.

The cross-linked polymers of component $(b)$ may be blended with the benzene-soluble component $(a)$ in proportions ranging from about 20 to 80 percent by weight, based on total weight of component $(a)$ plus component $(b)$. When the blend of these two components contains more than about 80 percent or less than 20 percent of the cross-linked polymer, the working properties of the composition tend to be unsatisfactory. The preferred amount of cross-linked polymer in the blend ranges from about 35 to 55 percent, i.e., a ratio of $(a)$ to $(b)$ between about 13:7 and about 9:11.

*Component $(c)$.*—Optionally, a third component, in amount up to 15 percent, based on total weight of the composition, may be used in preparing the blends of this invention. This third component is a benzene-soluble, fluid chloroprene polymer which may be prepared in a manner similar to that used in the preparation of component $(a)$ except that the polymerization is carried out in the presence of a larger amount of a modifying agent, preferably an alkyl mercaptan having 4 to 18 carbon atoms in the alkly radical. The polymerization may be stopped before polymerization is complete or allowed to go to 100 percent monomer conversion. By "fluid chloroprene polymer" is meant a chloroprene polymer having an intrinsic viscosity of the isolated polymer in benzene at 30° C. not greater than 0.15. Its benzene-solubility may be determined in the same way as described above for the polymers of component $(a)$. The presence of this third component improves the smoothness of the extrudate prepared from the elastomer composition of this invention. However, more than 15 percent of this component causes an undesirable loss of tensile strength in the final vulcanizate.

The blending of the components of the elastomeric composition of this invention is conveniently carried out by mixing the latices and then isolating the blend by conventional methods such as by coagulation, by freezing (as described in U.S. Patent 2,187,146) or by drum drying (as described in U.S. Patent 2,914,497). It is also possible first to isolate the individual components by conventional methods and then to mix the isolated polymers by mechanical means, such as by milling or by working in an internal mixer such as a Banbury or Werner-Pfleiderer mill.

The compounding of the elastomers of this invention is like that of the conventional polychloroprenes, as described in "The Neoprenes," published in 1953 by E. I. du Pont de Nemours and Co. In the examples, a fairly high loading of clay is used, as is customary in making tubing and other extruded articles, but the elastomeric compositions may also be used to advantage in gum stocks and stocks reinforced with carbon black. Waxes, oil, and other softeners and lubricants may, in general, be used, but large amounts are not necessary. When the optional fluid chloroprene polymer, component $(c)$, is present in the blend, reduced amounts of these oils and softeners are used. The use of oils and softeners in the blend improves the smoothness of the extrudates and lowers the bulk viscosity of the blend, but has a tendency to lower the tensile properties of the vulcanizate.

The preferred embodiments of the invention will now be described in and by the following examples:

EXAMPLE I

*Preparation of Benzene-Soluble Component (a)*

A chloroprene polymer latex is prepared using the following recipe:

| | Parts by weight |
|---|---|
| Chloroprene | 97 |
| 2,3-dichloro-1,3-butadiene | 3 |
| Technical dodecyl mercaptan | 0.25 |
| Disproportionated rosin | 3 |
| Water | 109 |
| Sodium hydroxide (100%) | 0.55 |
| Sodium salt of a condensation product of formaldehyde and naphthalenesulfonic acid | 0.40 |
| Sodium sulfite | 0.30 |

The catalyst solution has the following composition:

| | Parts by weight |
|---|---|
| Water | 4.0 |
| Potassium persulfate | 0.10 |
| Sodium 2-anthraquinonesulfonate | 0.005 |

Polymerization is carried out at 40° C. by addition of the catalyst solution to the aqueous emulsion of the monomer at a rate to give a rise in specific gravity of about 0.0005 g./cc./min. A nitrogen atmosphere is maintained in the polymerization vessel. When monomer conversion reaches about 70%, polymerization is stopped by the addition of a stabilizer emulsion having the following composition:

| | Parts by weight |
|---|---|
| Water | 0.42 |
| Sodium lauryl sulfate | 0.04 |
| Sodium salt of formaldehyde-naphthalenesulfonic acid condensate | 0.014 |
| Toluene | 0.90 |
| Phenothiazine | 0.014 |
| 4-tert-butylcatechol | 0.014 |

Unreacted monomer is removed in a turbannular stripper as described in U.S. 2,467,769. A 2-gram sample of the isolated polymer dissolves in 250 milliliters of benzene at room temperature in 5–10 hours with mild agitation. The solid polymer has a Mooney viscosity ML 1+2.5 at 100° C. of 45–54.

*Preparation of Cross-Linked Component (b)*

The polymerization equipment consists of a 5-liter flask containing the monomer emulsion, a 500-milliliter flask containing the catalyst solution, and a 3-liter polymerization flask equipped with an agitator. The monomer emulsion and catalyst solution are fed, by means of nitrogen pressure, from their respective flasks through rotameters to the polymerization flask. Approximately 300 milliliters of the monomer emulsion is transferred to the polymerization flask. Temperature is maintained at 40° C. by external cooling. Polymerization is initiated by the addition of catalyst solution to the polymerization flask. Thereafter, catalyst solution is added as needed to maintain the desired polymerization rate. Polymerization is allowed to proceed to approximately 85 percent conversion, and then continuous feed of additional monomer emulsion to the polymerization flask is begun. Monomer emulsion is fed at a rate of about 30 milliliters per hour, and catalyst solution is fed at a rate of about 3 milliters per hour. In this way the average value, $\bar{R}$, throughout the polymerization is about 0.84.

When the polymerization flask is full, feeds of monomer emulsion and catalyst solution are stopped. The polymerization temperature is maintained for an additional 1 to 2 hours. After this time polymerization is arrested by the additional of 15 grams of the shortstop emulsion. The mixture is then cooled to room temperature. Total monomer conversion is 95–97 percent.

The monomer emulsion has the following composition:

| | Parts by weight |
|---|---|
| Chloroprene | 100 |
| Disproportionated rosin | 3.0 |
| Water | 109.0 |
| Sodium hydroxide (100%) | 0.55 |
| Sodium salt of condensation product of formaldehyde and naphthalene-sulfonic acid | 0.4 |
| Sodium sulfite | 0.3 |

The catalyst solution has the following composition:

| | Parts by weight |
|---|---|
| Water | 115.0 |
| Potassium persulfate | 0.25 |
| Silver salt | 0.012 |

The short-stop emulsion has the following composition:

| | Parts by weight |
|---|---|
| Water | 300 |
| Sodium lauryl sulfate | 25.02 |
| Sodium salt of formaldehyde-naphthalenesulfonic acid condensate | 8.76 |
| Xylene | 561 |
| Phenothiazine | 8.76 |
| 4-tert-butylcatechol | 8.76 |

*Preparation of Fluid Polymer Component (c)*

A fluid chloroprene polymer is prepared using an aqueous emulsion of the following composition:

| | Parts by weight |
|---|---|
| Chloroprene | 100 |
| Technical dodecyl mercaptan | 5 |
| Disproportionated rosin | 4 |
| Water | 100 |
| Sodium hydroxide (100%) | 0.65 |
| Sodium sulfite | 0.30 |
| Sodium salt of formaldehyde-naphthalenesulfonic acid condensate | 0.50 |

The catalyst solution has the following composition:

| | Parts by weight |
|---|---|
| Water | 7.48 |
| Potassium persulfate | 0.02 |
| Sodium 2-anthraquinonesulfonate | 0.001 |

Polymerization is carried out at 40° C. by addition of the catalyst solution to the monomer emulsion at a rate to give a rise in specific gravity of about 0.0005 g./cc./min. Polymerization is allowed to proceed to 90–100 percent monomer conversion and the polymer emulsion is stabilized by addition of an emulsion of the following composition:

| | Parts by weight |
|---|---|
| Water | 0.60 |
| Sodium lauryl sulfate | 0.057 |
| Sodium salt of formaldehyde-naphthalenesulfonic acid condensate | 0.02 |
| Phenothiazine | 0.02 |
| 4-tert-butylcatechol | 0.02 |
| Toluene | 1.28 |

A sample of the polymer is isolated. The intrinsic viscosity, determined in benzene at 30° C., is 0.12.

Preparation of Blends

A blend is prepared by mixing the component (a), (b) and (c) latices prepared as described above in a proportion to give the following polymer content:

| | Parts by weight |
|---|---|
| Benzene-soluble component (a) | 52 |
| Cross-linked component (b) | 48 |
| Fluid polymer component (c) | 6.4 |

The latices are acidified by addition of 10 percent acetic acid to give a pH of 6 and then the latex is isolated by freezing in a thin layer on a rotating drum at −15° C., removing the polymer as a continuous sheet, washing with water, and drying.

In quantitatively evaluating the working properties of the elastomers of this invention a value designated as "die swell" is determined as follows:

The compounded stock is extruded through a 2-inch Royle extruder using a Garvey die. The compounded stock is warmed on a mill and fed to the extruder in strips. The temperature conditions of the extruder are as follows:

| | ° C. |
|---|---|
| Zone 1 | 88 |
| Zone 2 | 82 |
| Zone 3 | 71 |
| Die | 93 |
| Worm | 21–27 |

The speed of the worm is 35 r.p.m. The extrudate is taken from the extruder in two lengths. The length and weight of the extrudate are measured, and the weight in grams per inch of the extrudate is calculated. This value, which is designated as the "die swell," is a measure of the good processability of an elastomer. A high numerical value for die swell indicates a high "elastic memory" in the elastomer, i.e., the length of the extrudate has contracted with a consequent increase in weight per inch. The lower the number for the die swell, the better are the working properties of the polymer. The unblended benzene-soluble polymers of component (a) have die swells ranging from about 2.0 to 2.4. Therefore, a die swell value of 2.0 or greater indicates that the blend has essentially no improvement in working properties over the unblended benzene-soluble component (a).

The extrudates are examined visually for smoothness and die definition (feather edge). Where numerical ratings are given the scale is:

1 —Excellent
10—Very poor

The compounding recipe used in the test is as follows:

| | Parts by weight |
|---|---|
| Polymer or polymer blend | 100 |
| Magnesium oxide | 4 |
| N-phenyl-1-naphthylamine | 1 |
| Stearic acid | 0.5 |
| Clay | 90 |
| Light process oil | 12 |
| Paraffin wax | 1 |
| Petrolatum | 1 |

A blend is prepared as described above, compounded and extruded. The results of the tests are shown in Table I.

TABLE I

| | |
|---|---|
| Die swell g./in. | 1.75 |
| Smoothness | 1 |
| Feather edge | 2 |

For comparison, another polymer is prepared in the same manner as component (b) except as follows: the feed of additional monomer emulsion is begun when conversion reaches 70–75 percent. Monomer emulsion is fed at a rate of about 20 ml. per minute and catalyst solution feed is at a rate of about 0.3 to 0.5 ml. per minute. Both feeds are stopped when the flask is full and the temperature of 40° C. is maintained for an additional 2.5 hours. By specific gravity measurements the monomer conversion is calculated at intervals throughout the polymerization; the average value, $\overline{R}$, for this polymer is about 0.75, which does not come within the defined invention. When this polymer is substituted for component (b) in the blend prepared above and is compounded, extruded and evaluated, it is found that the die swell is 2.11 g./in.; the smoothness is 5, and the feather edge is 7.

The results in Table I above show that the blend containing component (b), which is prepared in such a way that the $\overline{R}$ value during polymerization is above 0.8, is markedly better in processability than the blend containing polymer which is prepared in a system in which the $\overline{R}$ value is 0.75 (i.e., less than 0.8). The latter blend has a die swell in the range 2.0–2.4 which is no better than the range of the die swells shown by unblended benzene-soluble chloroprene polymers.

EXAMPLE II

A polymer is prepared in the same way as component (b) of Example I except that feed of additional monomer emulsion is begun when the monomer conversion reaches about 90 percent and the polymerization temperature is 55° C. Monomer emulsion is fed at a rate of about 20 ml. per minute and feed catalyst solution is at a rate of about 0.3 to 0.5 ml. per minute. The monomer conversion is calculated at intervals during the polymerization and from this figure the ratio $P/P+M$ is calculated and plotted against P throughout the polymerization. The average value, $\overline{R}$, throughout the polymerization is 0.84. The resulting latex is used as component (b) to prepare a polymer blend as described in Example I, except that the composition of the blend is as follows:

| | Parts by weight |
|---|---|
| Component (a) of Example I | 63 |
| Component (b) of this example | 37 |
| Component (c) of Example I | 5.3 |

When this blend is compounded and extruded as described in Example I, it has a die swell of 1.75 g./in.

A sample of the polymer blend is compounded as described in Example I, except that 5 parts of zinc oxide and 0.5 part of 2-mercapto-2-imidazoline are added. Samples are cured in a mold in a press for 30 minutes at 153° C. The tensile properties are measured at 25° C. by ASTM Method D–412–51T.

The cured stock has the following properties:

| | |
|---|---|
| Tensile strength at the break, p.s.i. | 1210 |
| Elongation at the break, percent | 500 |
| Modulus at 300 percent elongation, p.s.i. | 670 |

EXAMPLE III

Example II is repeated except that the blend used has the following composition:

| | Parts by weight |
|---|---|
| Component (a) of Example I | 57 |
| Component (b) of Example II | 43 |
| Component (c) of Example I | 6.4 |

When the blend is compounded and extruded as described in Example I, it has a die swell of 1.71 g./in. When the stock is cured as described in Example II it has the following tensile properties:

| | |
|---|---|
| Tensile strength at the break, p.s.i. | 1320 |
| Elongation at the break, percent | 560 |
| Modulus at 300 percent elongnation, p.s.i. | 610 |

EXAMPLE IV

Using the recipes given for the preparation of component (b) in Example I, a component (b) polymer is made herein by a continuous process. The reactor consists of a 3-liter reactor from which emulsion flows into a 1-liter post reactor and then to a receiver. Approximately 800 milliliters of monomer emulsion is transferred to the reactor and polymerized at 55° C. to a specific gravity of 1.070 (approximately 90% conversion). This requires about 2 hours. At this point continuous feed of monomer emulsion and catalyst solution is begun, and monomer conversion is held essentially constant throughout the polymerization. Feed rates of 20 ml./minute of the emulsion and 0.3 to 0.5 ml./minute of the catalyst solution are maintained. At equilibrium flow, the residence times in the reactor and post reactor are approximately 3 hours and 1 hour, respectively. Both vessels are maintained at 55° C. The product latex has a specific gravity of 1.077 (approximately 95% conversion). To each 3 liters of product latex is added 15 grams of the shortstop emulsion.

The sample of latex used in preparing blends is taken after four pot volumes of product have been discarded. In this way it is insured that the polymer evaluated has been prepared in a system which has reached a steady state in which the value R, is essentially constant at about 0.95.

Using the product latex, a blend is prepared having the following composition:

| | Parts by weight |
|---|---|
| Component (a) of Example I | 57 |
| Component (b) of this example | 43 |
| Component (c) of Example I | 6.4 |

The polymer blend is compounded and extruded as described in Example I.

A comparison is made with an unblended solid, benzene-soluble chloroprene polymer prepared in the same manner as component (a) of Example I except 100 parts of chloroprene monomer are used in its preparation.

TABLE II

| Extrusion data | Blend of this Example | Unblended Polymer |
|---|---|---|
| Die Swell | 1.75 | 2.03. |
| Smoothness | Very slightly rough | Rough and grainy. |
| Feather edge | Slightly torn | Torn. |

When blends are prepared consisting of, by weight, 80 parts of component (a) of Example I and 20 parts of component (b) of this example, and are compounded and extruded as described in Example I, the extrudate shows a die swell of approximately 1.90–1.95.

When blends are prepared consisting of, by weight, 20 parts of component (a) of Example I, 80 parts of component (b) of this example, and 8 parts of component (c) of Example I, the die swell of the extrudate is approximately 1.75.

If in the preparation of the benzene-soluble component (a) and in the preparation of the fluid polymer component (c) of Example I, up to about 50% by weight, based on total weight of monomer, of another ethylenically unsaturated monomer is copolymerized with the chloroprene monomer, blends having satisfactory working properties will still be obtained. Likewise, if in the preparation of cross-linked component (b) of Example I, up to about 10% by weight, based on total weight of monomer, of another ethylenically unsaturated monomer is copolymerized with the chloroprene monomer, satisfactory blends will still be produced. However, the improvement in extrusion properties is not obtained when the high-conversion component (b) is prepared by polymerizing chloroprene to 100 percent monomer conversion by a conventional batch process.

For example, a chlorophene polymerization using the recipe for component (b) of Example I, except that the monomer is polymerized to 100 percent conversion at 55° C. without any further addition of monomer emulsion, has a value, $\overline{R}$, of 0.5. If the polymer produced thereby is substituted for component (b) in the blend of Example I and compounded, extruded and evaluated as described therein, the die swell of the extrudate will be about 2.44 grams per inch, which is no better than that of unblended, benzene-soluble polymers of component (a).

The elastomer compositions of this invention display exceptionally good processability. They may be processed in any form of rubber-working equipment, such as internal mixers, compounding mills, calenders, extruders and the like, and used in fabricating tires and mechanical goods of all kinds, coated fabrics, tubing, coated wire, and extruded gaskets.

What is claimed is:

1. A process for preparing an easily-processable elastomeric blend which comprises: (1) preparing a cross-linked polymer by polymerizing chloroprene monomer with no more than about 10% by weight, based on total weight of monomer, of another ethylenically unsaturated monomer copolymerizable therewith selected from the group consisting of monoolefinic compounds and conjugated diolefinic compounds, in aqueous emulsion, the ratio $$R = \frac{\text{wt. of polymer}}{\text{wt. of polymer plus monomer}}$$

throughout the polymerization having an average value, $\overline{R}$, of at least 0.8, and (2) blending the cross-linked polymer obtained from step (1) with a solid, benzene-soluble chloroprene polymer in a weight basis ratio between about 1:4 and about 4:1.

2. A process according to claim 1 wherein a fluid, benzene-soluble chloroprene polymer having an intrinsic viscosity in benzene at 30° C. not greater than 0.15 is incorporated into the blend in an amount no more than about 15 percent of the total weight of the blend.

3. A process according to claim 1 wherein the ratio of solid, benzene-soluble polymer to cross-linked polymer on a weight basis is between about 13:7 and about 9:11.

4. A process according to claim 1 wherein the average value, $\overline{R}$, is at least 0.88.

5. A process according to claim 2 wherein the ratio of solid, benzene-soluble polymer to cross-linked polymer on a weight basis is between about 13:7 and about 9:11.

6. A process to claim 2 wherein the average value, $\overline{R}$, is at least 0.88.

References Cited in the file of this patent

UNITED STATES PATENTS

| 2,763,635 | Tucker et al. | Sept. 18, 1956 |
| 3,042,652 | Pariser et al. | July 3, 1962 |